(12) United States Patent
Connell et al.

(10) Patent No.: US 7,939,603 B2
(45) Date of Patent: May 10, 2011

(54) POLYLACTIDE COMPOSITES AND METHODS OF PRODUCING THE SAME

(75) Inventors: Eric John Connell, Ann Arbor, MI (US); Marc Andrew Hillmyer, Minneapolis, MN (US); Megan Lind Robertson, Minneapolis, MN (US)

(73) Assignees: Regents of the University of Minnesota, St. Paul, MN (US); Toyota Motor Engineering & Manufacturing North America, Inc., Erlanger, KY (US)

( * ) Notice: Subject to any disclaimer, the term of this patent is extended or adjusted under 35 U.S.C. 154(b) by 15 days.

(21) Appl. No.: 12/471,755

(22) Filed: May 26, 2009

(65) Prior Publication Data

US 2010/0305275 A1    Dec. 2, 2010

(51) Int. Cl.
*C08F 242/00* (2006.01)

(52) U.S. Cl. ........ 525/190; 525/186; 525/418; 525/419; 525/437; 525/445; 525/450

(58) Field of Classification Search .................. 525/418, 525/419, 437, 450, 445, 190
See application file for complete search history.

(56) References Cited

U.S. PATENT DOCUMENTS

| | | |
|---|---|---|
| 4,369,284 A | 1/1983 | Chen |
| 5,166,376 A | 11/1992 | Suzuki et al. |
| 5,206,087 A | 4/1993 | Tokiwa et al. |
| 5,359,026 A | 10/1994 | Gruber |
| 5,407,715 A | 4/1995 | Buddenhagen et al. |
| 5,756,651 A | 5/1998 | Chen et al. |
| 5,795,969 A | 8/1998 | Fehr et al. |
| 5,858,934 A | 1/1999 | Wiggins et al. |
| 5,869,164 A | 2/1999 | Nickerson et al. |
| 5,908,918 A | 6/1999 | Chen et al. |
| 5,916,950 A | 6/1999 | Obuchi et al. |
| 5,922,832 A * | 7/1999 | Randall et al. ............... 528/354 |
| 5,981,781 A | 11/1999 | Knowlton |
| 5,998,552 A | 12/1999 | Gruber et al. |
| 6,103,834 A | 8/2000 | Espinoza |
| 6,291,597 B1 | 9/2001 | Gruber et al. |
| 6,355,693 B1 | 3/2002 | Herslof et al. |
| 6,869,985 B2 | 3/2005 | Mahanty et al. |
| 7,196,124 B2 * | 3/2007 | Parker et al. ............... 523/457 |
| 7,256,223 B2 | 8/2007 | Mohanty et al. |
| 7,354,656 B2 | 4/2008 | Mohanty et al. |
| 2003/0088003 A1 * | 5/2003 | Corzani et al. ............... 524/270 |
| 2004/0034128 A1 | 2/2004 | Tokiwa et al. |
| 2006/0041157 A1 | 2/2006 | Petrovic et al. |
| 2006/0121170 A1 | 6/2006 | Howard |
| 2006/0258544 A1 | 11/2006 | Saini |
| 2007/0015929 A1 | 1/2007 | Casper |
| 2007/0077298 A1 | 4/2007 | Liu et al. |
| 2008/0281018 A1 | 11/2008 | Seeliger et al. |

OTHER PUBLICATIONS

Schmidt, S.C.; Hillmyer, M.A.; Macromolecules, 1999, p. 4794-4801.*
Frick, E.M.; Hillmyer, M.A.; Macromol. Rapid Commun., 2000, p. 1317-1322.*
Frick, E.M.; Zalusky, A.S.; Hillmyer, M.A.; Biomacromolecules, 2003, p. 216-223.*
Fathilah Ali et al., Thermal, mechanical and rheological properties of poly (lactic acid)/epoxidized soybean oil blends, Polymer Bulletin, Oct. 20, 2008.
Kelly S. Anderson et al., "The influence of block copolymer microstructure on the toughness of compatibilized polylactide/polyethylene blends", ScienceDirect, Nov. 17, 2004.
Yongjin Li et al., "Toughening of Polylactide by Melt Blending with a Biodegradable Poly(ether)urethane Elastomer", Wiley InterScience Journals, Apr. 16, 2007.
Zuleica Lozada et al., "Preparation of polymerized soybean oil and soy-based polyols", Wiley InterScience Journals, Nov. 9, 2008.

* cited by examiner

*Primary Examiner* — David Wu
*Assistant Examiner* — Robert Jones
(74) *Attorney, Agent, or Firm* — Dinsmore & Shohl LLP (57) ABSTRACT

Embodiments of polylactide composites comprise a polylactide, and a polymerized natural oil dispersed inside the polylactide.

26 Claims, 5 Drawing Sheets

POLYLACTIDE COMPOSITES AND METHODS OF PRODUCING THE SAME

TECHNICAL FIELD

The present disclosure is generally related to polylactide composites and methods of producing polylactide composites, and is specifically related to improving the toughness of polylactides by mixing the same with polymerized natural oil.

BACKGROUND

Current environmental concerns have increased the desirability of industrial applications which utilize biorenewable materials, such as polylactides. Polylactides are biodegradable polymer resins useful in various industries, for example, plastics industries, such as the flooring industry and the packaging industry. Polylactides may be applicable in any industry which utilizes plastics, specifically, injection molded plastics.

However, polylactide is a brittle material which limits its efficacy in some industrial applications. Consequently, conventional processes attempt to improve the toughness of polylactides by blending with another component in order to tune the properties of the final composite. These conventional processes blend the polylactides with rubbery non-renewable polymers (e.g., polyethylene, polyurethane, and acrylic impact modifiers), and have shown significant improvements in the impact strength and elongation at break of the material. Other conventional processes blend polylactides with epoxidized soybean oil, a renewable material; however, the resulting blends did not achieve the properties of the blends containing non-renewable additives. Thus, there is a continual desire to improve the relevant mechanical properties (e.g., tensile toughness, elongation at break, and impact strength) of the polylactide by blending with a renewable component.

SUMMARY

Embodiments discussed herein are generally directed to improving the toughness (as defined by the impact strength or tensile toughness) of polylactide by blending with polymerized natural oil.

In one embodiment, a polylactide composite is provided. The polylactide composite comprises a polylactide, and polymerized natural oil dispersed inside the polylactide.

In a further embodiment, the polylactide composite may comprise a block copolymer configured to aid the dispersion of the polymerized natural oil inside the polylactide.

In another embodiment, a method of producing a polylactide composite is provided. The method comprises the steps of providing a natural oil, polymerizing the natural oil, and forming a polylactide composite by blending the polymerized natural oil with a polylactide to disperse the polymerized oil inside the polylactide.

These and additional features provided by the embodiments will be more fully understood in view of the following detailed description, in conjunction with the drawings.

BRIEF DESCRIPTION OF THE DRAWINGS

The following detailed description of specific embodiments can be better understood when read in conjunction with the drawings enclosed herewith.

The embodiments set forth in the drawings are illustrative in nature and not intended to be limiting of the scope defined by the claims. Moreover, individual features of the drawings will be more fully apparent and understood in view of the detailed description.

DETAILED DESCRIPTION

Embodiments are directed to polylactide composites and methods of producing polylactide composites. The polylactide composites generally comprise a polylactide, and a polymerized natural oil dispersed inside the polylactide, wherein the polymerized natural oil increases the toughness (e.g., the elongation at break or tensile toughness) of the polylactide composite. Polylactide composites may be used as described herein in any field. In one embodiment, polylactide composites may be used with automotive parts, such as a scuff plate under a vehicle door, a panel in the interior or trunk of a vehicle and so forth.

Figure 1:
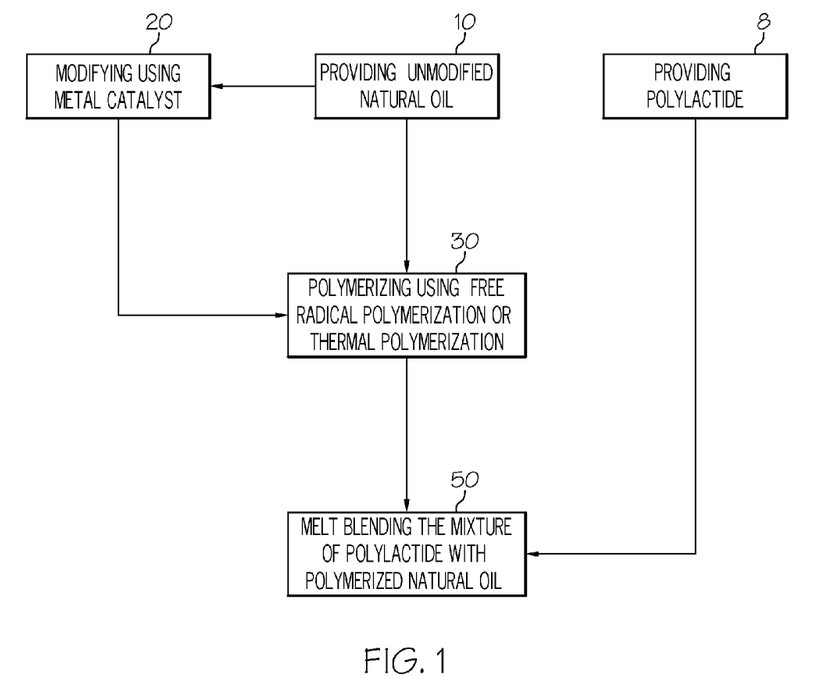
FIG. 1 is a schematic flow chart illustrating an exemplary method of making polylactide composites according to one or more embodiments.

An exemplary method of making the polylactide composite is shown in FIG. 1. As more fully described herein, a polylactide may be provided (step 8), and a natural oil (modified or unmodified) may also provided (step 10). The natural oil may directly undergo polymerization (step 30), or may be modified (step 20) prior to polymerization (step 30). After the natural oil is polymerized, the polymerized natural oil may be melt blended (step 50) with a polylactide. The polymerized natural oil may be added via any suitable mechanism, for example, the polymerized natural oil may be added in portions to the polylactide matrix. The melt blending may occur at any temperature sufficient to disperse the polymerized oil inside the polylactide. The melt blending may occur at a temperature between about 100° C. to about 250° C., or between about 150° C. to about 250° C., or at about 190° C., and may occur for a time up to 1 hour, or less than about 30 minutes, or up to about 20 minutes. Optionally, the blends may be extruded and immediately quenched in liquid nitrogen to preserve the morphology.

The polylactide may be any polylactide suitable for use in a biorenewable blend, for example, a polylactide homopolymer. In one embodiment, the polylactide may comprise poly (L-lactide) (PLLA), its stereoisomers, or combinations thereof. The PLLA may be produced through various methods familiar to one of ordinary skill in the art, for example, ring opening polymerization of L-lactide. The polylactide may be present in the polylactide composite in an amount from about 50% to about 99%, or from about 70% to about 99%, or from about 80% to about 95% by wt of the polylactide composite. The polylactide may also include other materials blended or disposed therewith, for example, poly(vinyl chloride), poly(ethylene glycol), poly(glycolide), poly(ethylene-co-vinyl acetate), poly(carbonate), poly(caprolactone), poly(hydroxyalkanoate)s, or polyolefins modified with polar groups, for example, ionomers.

As described herein, a "natural oil" may include vegetable oils or any other suitable biorenewable oil. Further as used herein, vegetable oils means a mixture of triglycerides with a varying degree of unsaturated fatty acids. For example, and not by way of limitation, the natural oil may be selected from the group consisting of soybean oil, castor oil, coconut oil, corn oil, cottonseed oil, flax oil, hemp oil, mustard oil, canola oil, palm oil, peanut oil, radish oil, rapeseed oil, rice bran oil, safflower oil, sunflower oil, olive oil, and combinations thereof. Other additional oils are contemplated herein. In a specific embodiment, the natural oil may comprise soybean oil. Soybean oil provides many advantages, for example, abundance, low cost, edibility, biodegradability, renewability, and combinations thereof. The polymerized natural oil may be present in the polylactide composite at an amount of between about 5% to about 30% by wt., or from 5% to about 15% by wt of polymerized natural oil.

Additionally, the natural oil may be modified or unmodified prior to polymerization. "Modified," as used herein, means that the natural oil is conjugated or functionalized with another reactive substituent, whereas "unmodified," as used herein, means that the natural oil is not conjugated or functionalized with any reactive substituent. The natural oils may be modified via processes such as epoxidization, esterification, maleinization, or acrylation. In one specific embodiment, the natural oil may be conjugated using a metal catalyst (e.g., carbonylchlorohydridotris(triphenylphosphine)ruthenium(II)). Various other modification processes and modifying are contemplated herein.

By conjugating or functionalizing the natural oil, the modified natural oil may be made more reactive, which greatly increases the polymerization reaction rate for free radical initiated polymerization or thermally induced polymerization as described below. For example, the polymerization time may be decreased by about 1 to about 10 hours by modifying the oil prior to polymerization. Additionally, modifying the oil also reduces the amount of crosslinking agent required for effective free radical polymerization, or may eliminate the need for a radical initiator entirely. For example, the amount of crosslinking agent may be decreased by about 2 to about 10% by weight for modified natural oils.

Many polymerization methodologies are considered suitable for polymerization of the natural oil. In one embodiment, the polymerization of the natural oil may occur via free radical polymerization using a crosslinking agent. The crosslinking agent may include any suitable free radical initiator such as a peroxide crosslinker. In one exemplary embodiment, the peroxide crosslinking agent is dicumyl peroxide. The natural oil may alternatively undergo thermal polymerization, wherein polymerization is initiated through the addition of heat in the presence of oxygen. In one embodiment, the thermal polymerization occurs at a temperature from about 150° C. to about 200° C. With thermal polymerization, both the modified and unmodified natural oils may be polymerized without the addition of the radical initiator. While eliminating or substantially reducing the need for a crosslinking agent, thermal polymerization tends to have a slower reaction rate than normal free radical polymerization. In a further embodiment, it is contemplated that thermal polymerization and normal free radical polymerization may both be utilized.

In the present polymerized natural oil, the resulting material may contain a gel fraction, as defined by the fraction of the material that is insoluble. The soluble part of the material may be characterized by weight-average and number-average molecular weights. As used herein, "gel fraction" means the fraction (by weight) of the natural oil that is insoluble. For example, a gel fraction of 1 means that the all of the polymerized oil is insoluble. In one or more embodiments, the polymerized natural oil may comprise a gel fraction from about 0 to about 1 or about 0 to about 0.70 or about 0 to about 0.55 or about 0.30 to about 0.55 or about 0.40.

Figure 3:
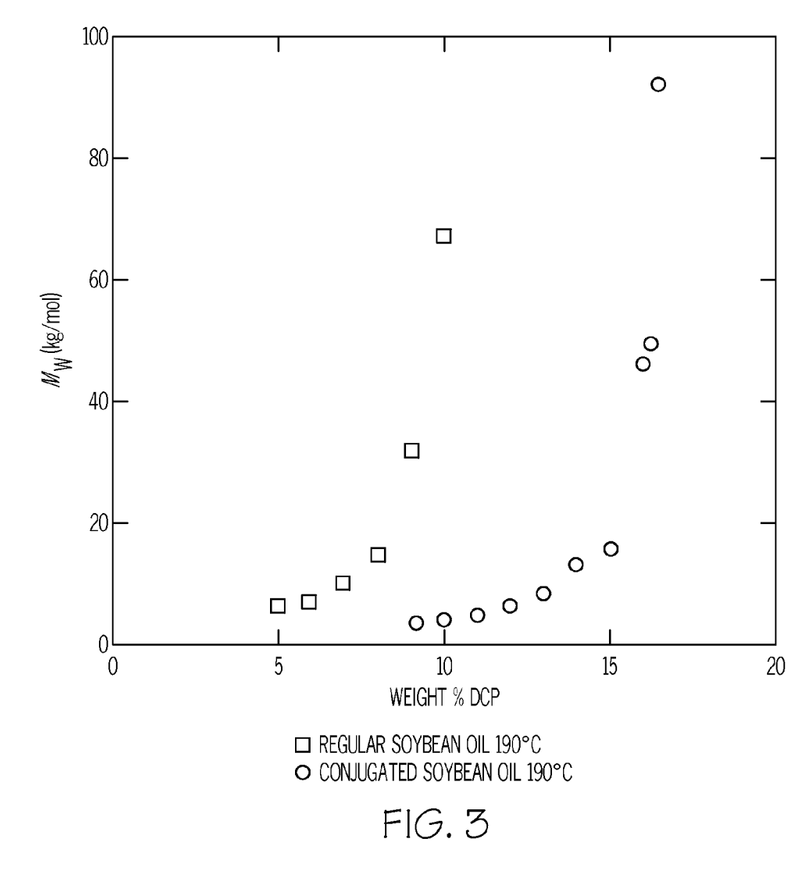
FIG. 3 is a graphical illustration demonstrating the effects of modifying the natural oil, specifically the decrease in the amount of crosslinker required for free radical polymerization of a modified natural oil, according to one or more embodiments.
Figure 4:
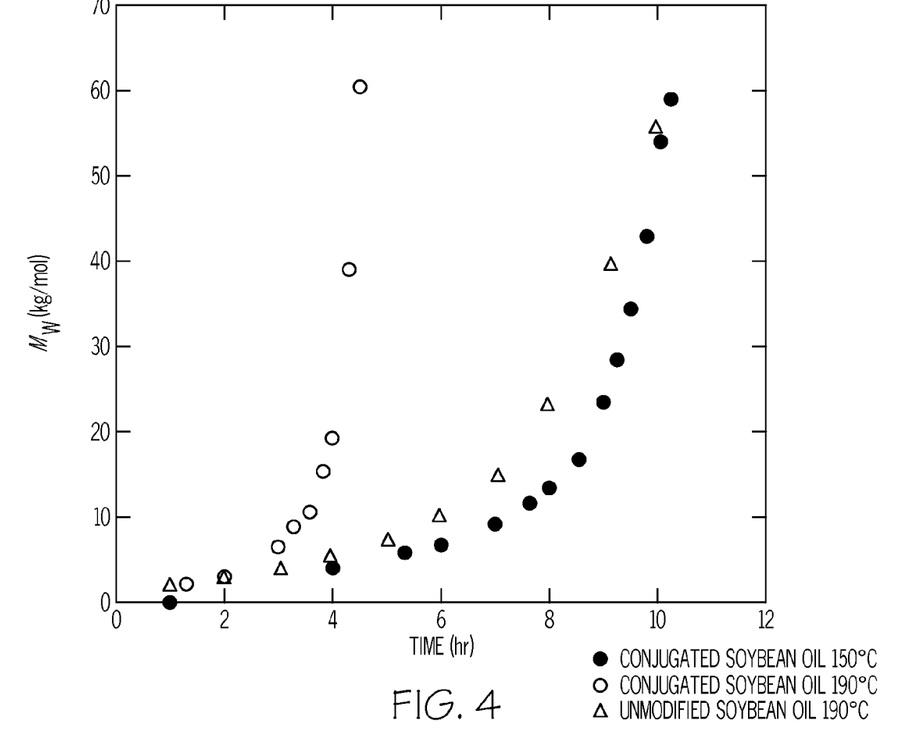
FIG. 4 is a graphical illustration demonstrating the effects of modifying the natural oil, specifically the decrease in the polymerization time when conducting thermal polymerization of a modified natural oil, according to one or more embodiments.

As discussed above, the natural oils described herein may be modified or remain unmodified prior to polymerization. FIGS. 3 and 4 are graphical illustrations which quantitatively demonstrate the benefits of modifying the natural oil (i.e., soybean oil) prior to polymerization. As described above, the soybean oil was modified using carbonylchlorohydridotris (triphenylphosphine)ruthenium(II)). As shown in the graphical illustration of FIG. 3, a modified soybean oil requires less dicumyl peroxide initiator during free radical polymerization than an unmodified soybean oil. For example, to achieve a weight average molecular weight of above 40 kg/mol, the modified soybean oil requires slightly more than 8% dicumyl peroxide, whereas the unmodified oil requires close to 16% dicumyl peroxide for free radical polymerization. Moreover, as shown in the graphical illustration of FIG. 4, a modified soybean oil has a faster thermal polymerization rate than an unmodified soybean oil. For example, at a molecular weight of slightly about 40 kg/mol, the modified soybean oil undergoes thermal polymerization in approximately 250 minutes, whereas polymerization of the unmodified oil undergoes thermal polymerization in approximately 550 minutes. It should be understood, however, that while the foregoing example illustrates the benefits of modifying a particular type of natural oil (i.e., soybean oil) prior to polymerization, it is contemplated that other natural oils may achieve the same benefits with the same or different modifications.

Natural oils (e.g., unmodified soybean oil) are highly immiscible with polylactide. Secondly, there is a great disparity in the viscosities of the oils and polylactide. For instance, the viscosity ratio (at 190° C.) of unmodified soybean oil ($\eta_{SOY}$) to PLLA ($\theta_{pPLLA}$) is $\eta_{SOY}/\eta_{PLLA} \sim 10^{-5}$ in simple steady shear. Due to both of these factors, it is challenging to prepare a blend that contains more than 5% by wt. of natural oil as a dispersed phase in a polylactide matrix. The present inventors have found that polymerization increases the amount of the natural oil that can be dispersed inside the polylactide (without the presence of additional modifying agents) by reducing the disparity in viscosity between the natural oil and the polylactide. Polymerization increases the viscosity of the natural oil, thereby minimizing the viscosity difference between the natural oil and the polylactide. For polymerized oils with a gel fraction of zero (and varying weight-average molecular weights), polymerization may increase the viscosity by about 1 order of magnitude or more. With a modest increase in viscosity, the polymerized oil may be dispersed in polylactide at a concentration as high as 15%, or possibly even more. For polymerized oils with a gel fraction greater than zero, the materials have a solid-like characteristic and also are completely incorporated into the polylactide. While the range of polymerized natural oil is disclosed as from about 5 to about 30% by weight of the polylactide composite, the polymerizing may facilitate dispersions of polymerized natural oil of greater than 30% inside the polylactide matrix.

Additionally, oil loss is highly common when unpolymerized natural oil is melt blended with polylactide, because the large disparity in viscosity greatly limits the incorporation of the unpolymerized oil inside the polylactide matrix. However, polymerizing the natural oil to increase the viscosity and minimize the viscosity disparity eliminates this oil loss. In essence, polymerizing the oil helps eliminate leaking of the polymerized oil out of the polylactide matrix during mixing.

To illustrate the change in viscosity produced by polymerization, Table 1 is provided below. As shown, polymerizing a modified soybean oil raises the viscosity from 0.002 to about 0.04 Pa-s and thereby raises the percent (%) incorporation of polymerized oil inside the polylactide from 40 to 100%.

TABLE 1

| Particle Phase | Viscosity (Pa-s) (190° C., 100 rad/s) | % Incorporation of SOY or polySOY |
| --- | --- | --- |
| Soybean oil | 0.002 | 40 |
| Polymerized soybean oil (Mw = 19 kg/mol, Gel fraction = 0) | 0.01 | 100 |
| Polymerized soybean oil (Mw = 46 kg/mol, Gel fraction = 0) | 0.04 | 100 |

Increasing the viscosity of the natural oil particle phase by polymerization leads to minimization of the dispersed particle size inside the polylactide matrix. In one embodiment, the polymerized oil defines an average particle size of from about 0.4 μm to about 2.8 μm. In contrast, the use of unmodified and unpolymerized oil achieved an average particle size of around 10 μm. By decreasing the size of the polymerized natural oil dispersion inside the polylactide matrix, the toughness (e.g. tensile toughness and elongation at break as described in detail below) of the polylactide composite is improved. In exemplary embodiments, the polylactide composite may comprise a tensile toughness of from about 2 MPa to about 9 MPa.

Furthermore, polymerizing the natural oil eliminates phase inversion of the polylactide and the natural oil phase dispersed therein. Phase inversion is highly common when unpolymerized natural is melt mixed with polylactide, because of the large disparity in viscosity between polylactide and natural oils. However, polymerizing the natural oil to increase the viscosity and minimize the viscosity disparity eliminates this phase inversion and oil loss. In fact, the present inventors surprisingly found that only a small degree of polymerization is required (e.g., a raise in the weight-average molecular weight to 19 kg/mol for samples with a gel fraction of 0) to modify the viscosity enough the prevent phase inversion.

Figure 2:
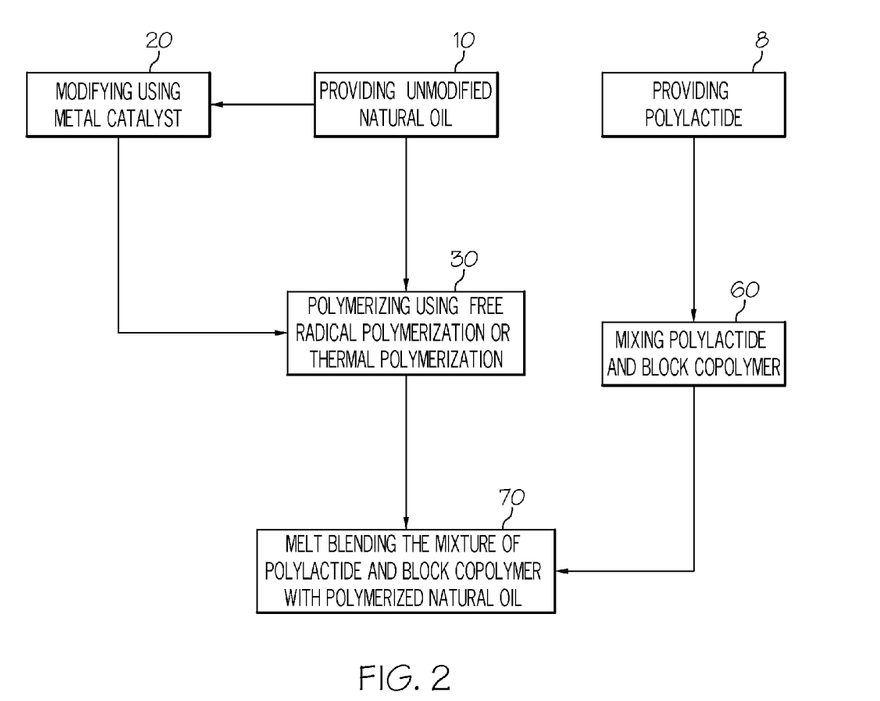
FIG. 2 is another schematic flow chart illustrating an exemplary method of making polylactide composites according to one or more embodiments.

While binary blends comprising polymerized oil and polylactide have improved properties as described above, it may be desirable to further improve the toughness of the polylactide composite by adding a block copolymer. Adding a block copolymer into the composite may further decrease the particle sizes of the polymerized natural oil inside the polylactide, and also increase the interfacial adhesion between the two phases. An exemplary method of making the ternary polylactide composite with a block copolymer is shown in FIG. 2. As more fully described herein, a polylactide may be provided (step 8), and may be subsequently mixed with a block copolymer (step 60). The natural oil (modified or unmodified) (step 10) may directly undergo polymerization (step 30), or may be modified (step 20) prior to polymerization (step 30). After the natural oil is polymerized, the polymerized natural oil may be melt blended (step 70) with a mixture of the polylactide and the block copolymer. While FIG. 2 depicts the polylactide and a block copolymer mixing prior to the addition of the polymerized natural oil, it is contemplated that the reactants of the polylactide composite may be added in various sequences without affecting the final properties of the composite.

The block copolymer may comprise any polymer composition suitable to aid in the dispersion of polymerized natural oil inside a polylactide matrix (e.g., a surfactant). The block copolymer may comprise various properties optimized for the present dispersion. In one embodiment, the block copolymer comprises a polyisoprene-polylactide block copolymer, such as poly(isoprene-b-lactide) (ILLA). Block copolymers with substantially symmetric compositions and a molecular weights of the polyisoprene blocks between about 5,900-24,000 daltons may be used. It is contemplated that the polyisoprene-polylactide comprises at least about 70% by volume ($f_{PLLA}$) polylactide. For example, the composite may comprise about 0.1% to about 10% by wt. of the block copolymer, or from about 2 to about 6% by wt. of the block copolymer.

By adding the block copolymer, the particle size of the polymerized oil is decreased such that the particles may define an average particle size of from about 0.2 μm to about 2.3 μm. By decreasing the particle size, the block copolymer may enable the polylactide composite to achieve an improved toughness, for example, a tensile toughness about 2 times greater than the tensile toughness of a blend without a polymerized oil and a block copolymer, and 4 times that of neat PLLA. In one embodiment, a polylactide composite with a block copolymer includes a tensile toughness of from about 2 MPa to about 9 MPa, or about 6 to about 9 mPa.

Figure 5A:
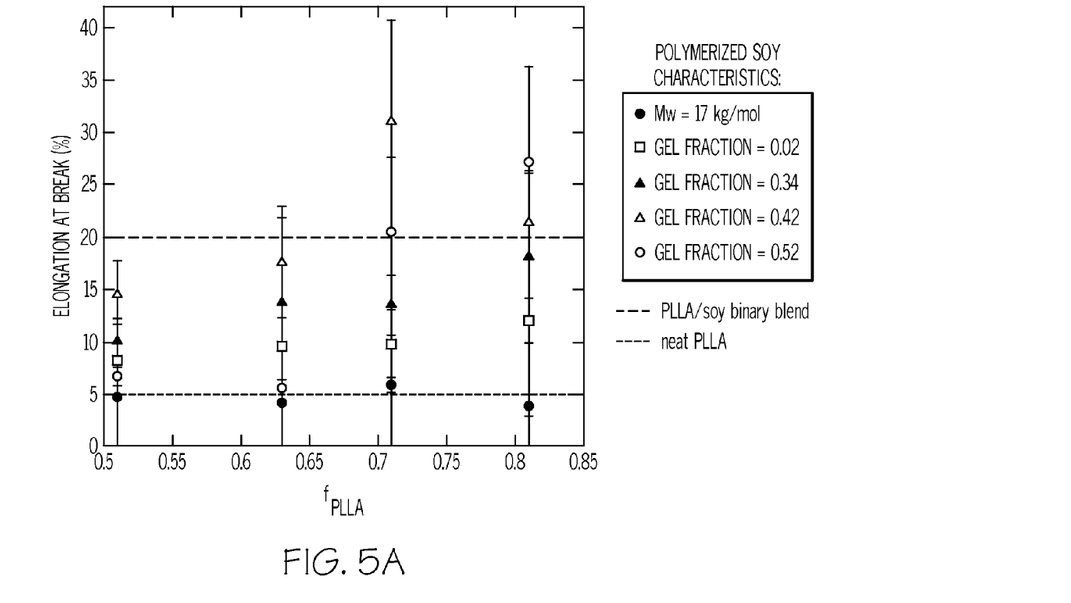
FIG. 5A is a graphical illustration demonstrating the increased elongation at break for blends comprising polymerized soybean oil produced by optimizing polymerized soybean oil characteristics according to one or more embodiments.
Figure 5B:
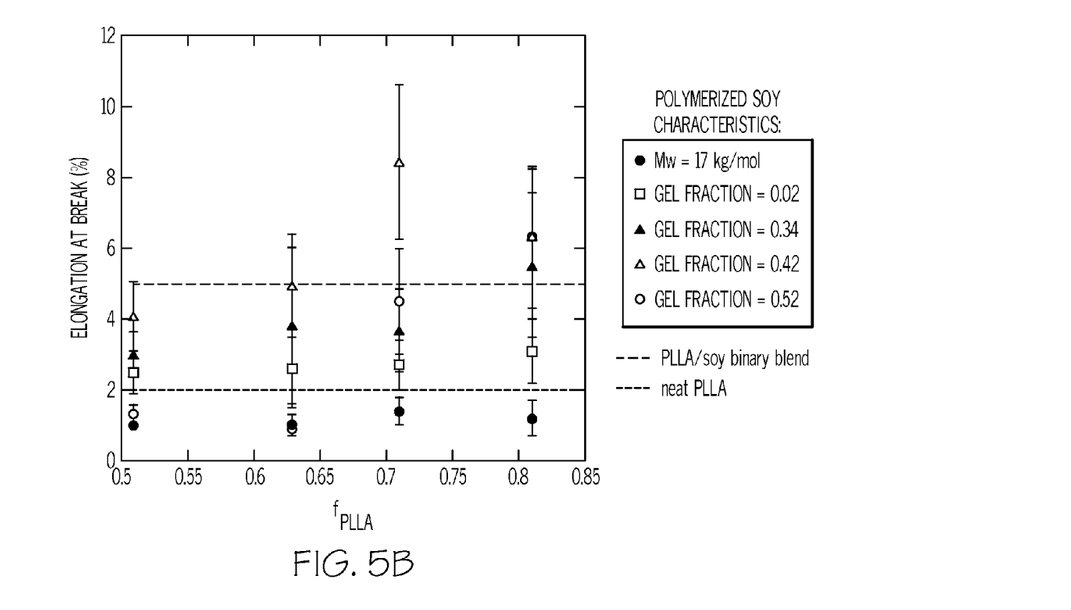
FIG. 5B is a graphical illustration demonstrating the increased tensile toughness for blends comprising polymerized soybean oil produced by optimizing polymerized soybean oil characteristics according to one or more embodiments.

As shown in the graphical illustrations of FIGS. 5A and 5B, polymerizing natural oils and optionally adding a block copolymer yield improves the mechanical properties of the polylactide composite, such as tensile strength and elongation. Referring to FIG. 5A, for composites having an ILLA block copolymer with an $f_{PLLA}$ (volume fraction of PLLA in the block copolymer) of around 0.7 and containing polymerized soy with gel fraction just above 0.4 the elongation at break is around 30%. This is compared to PLLA blends containing unpolymerized soybean oil which have an elongation around 20% (dashed line in FIG. 5A) and neat PLLA which has an elongation of around 5% (dotted line in FIG. 5A). Similarly as shown in FIG. 5B, for composites having an ILLA block copolymer with an $f_{PLLA}$ of around 0.7 and containing polymerized soy with gel fraction just above 0.4 the tensile toughness is around 8 MPa. This is compared to PLLA blends containing unpolymerized soybean oil which have a tensile toughness around 5 MPa (dashed line in FIG. 5B) and neat PLLA which has an tensile toughness of around 2 MPa (dotted line in FIG. 5B).

It is further noted that terms like "preferably," "generally," "commonly," and "typically" are not utilized herein to limit the claim scope or to imply that certain features are critical, essential, or even important to the structure or function of the claimed scope. Rather, these terms are merely intended to highlight alternative or additional features that may or may not be utilized in a particular embodiment.

For the purposes of describing and defining the present embodiments, it is additionally noted that the terms "about," "substantially," or the like are utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described in detail and by reference to specific embodiments thereof, it will be apparent that modifications and variations are possible without departing from the scope of the appended claims. More specifically, although some aspects provided in the present specification are identified herein, it is contemplated that the present claims are not necessarily limited to these aspects.

What is claimed is:

1. A polylactide composite comprising:
   a polylactide; and
   a polymerized natural oil dispersed inside the polylactide, wherein the polymerized natural oil has a gel fraction of between from about 0 to about 0.55.

2. The polylactide composite of claim 1 wherein the polymerized oil defines an average particle size of from about 0.2 μm to about 5 μm.

3. The polylactide composite of claim 1 wherein the polylactide comprises poly(L-lactide), its stereoisomers, or combinations thereof.

4. The polylactide composite of claim 1 wherein the polylactide composite comprises about 80 to about 95% by wt polylactide, and about 5% to about 15% by wt. of polymerized natural oil.

5. The polylactide composite of claim 1 wherein the polymerized natural oil comprises soybean oil.

6. The polylactide composite of claim 1 wherein the polymerized natural oil is a modified polymerized natural oil.

7. The polylactide composite of claim 1 further comprising:
   a block copolymer, wherein the block copolymer is configured to aid the dispersion of the polymerized natural oil inside the polylactide.

8. The polylactide composite of claim 7 wherein the polymerized oil defines an average particle size of from about 0.2 μm to about 2.3 μm.

9. The polylactide composite of claim 1 wherein the polylactide composite defines a tensile toughness of from about 2 MPa to about 9 MPa.

10. The polylactide composite of claim 1 wherein the polylactide composite defines a tensile toughness of from about 6 MPa to about 9 MPa.

11. The polylactide composite of claim 7 wherein the block copolymer comprises poly(isoprene-b-lactide).

12. The polylactide composite of claim 7 wherein the polylactide composite comprises from about 0.1% to about 10% by wt block copolymer.

13. A method of producing a polylactide composite comprising:
   providing a natural oil;
   polymerizing the natural oil, wherein the polymerized natural oil has a gel fraction of between from about 0 to about 0.55; and
   forming a polylactide composite by melt blending the polymerized natural oil with a polylactide to disperse the polymerized oil inside the polylactide.

14. The method of claim 13 further comprising adding a block copolymer to the polylactide prior to blending with the polymerized natural oil.

15. The method of claim 13 further comprising modifying the natural oil prior to polymerization.

16. The method of claim 13 wherein the polymerization occurs via free radical polymerization using a crosslinking agent, or via thermal polymerization.

17. A polylactide composite comprising:
   a polylactide; and
   a polymerized natural oil dispersed inside the polylactide, wherein the polymerized natural oil consists essentially of modified or unmodified oil.

18. The polylactide composite of claim 17 further comprising a block copolymer, wherein the block copolymer is configured to aid the dispersion of the polymerized natural oil inside the polylactide.

19. The polylactide composite of claim 17 wherein the polymerized oil defines a gel fraction of between from about 0 to about 0.55.

20. The polylactide composite of claim 17 wherein the polylactide composite defines a tensile toughness of from about 2 MPa to about 9 MPa.

21. The polylactide composite of claim 1 wherein the polymerized oil defines an average particle size of from about 0.2 μm to about 5 μm.

22. A polylactide composite comprising:
   a polylactide; and
   a polymerized natural oil dispersed inside the polylactide, wherein the polymerized oil defines an average particle size of from about 0.2 μm to about 5 μm.

23. The polylactide composite of claim 22 wherein the polylactide composite defines a tensile toughness of from about 2 MPa to about 9 MPa.

24. The polylactide composite of claim 22 wherein the polymerized oil defines an average particle size of from about 0.2 μm to about 2.3 μm.

25. The method of claim 13, wherein the polymerized oil defines an average particle size of from about 0.2 μm to about 5 μm.

26. The method of claim 13, wherein the polylactide composite defines a tensile toughness of from about 2 MPa to about 9 MPa.

* * * * *

UNITED STATES PATENT AND TRADEMARK OFFICE
CERTIFICATE OF CORRECTION

PATENT NO.       : 7,939,603 B2                                   Page 1 of 1
APPLICATION NO.  : 12/471755
DATED            : May 10, 2011
INVENTOR(S)      : Eric John Connell et al.

It is certified that error appears in the above-identified patent and that said Letters Patent is hereby corrected as shown below:

Col. 8, Claim 21, Lines 32-34 should read:

The polylactide composite of claims ~~1~~ 17 wherein the polymerized oil defines an average particle size of from about 0.2 μm to about 5 μm.

Signed and Sealed this
Ninth Day of August, 2011

David J. Kappos
*Director of the United States Patent and Trademark Office*